May 17, 1966 H. A. KAFITZ 3,251,929

AUTOMATIC LINE SWITCHING SYSTEM

Filed Dec. 3, 1962 6 Sheets-Sheet 1

INVENTOR
HENRY A. KAFITZ

BY J. Hamill

ATTORNEY

SIGNAL LINE CIRCUIT

INTERNAL LINE CIRCUIT

BREAK RECOGNITION RELAY CIRCUIT

INVENTOR
HENRY A. KAFITZ
BY J J Hamill
ATTORNEY

CROSS BAR SWITCH

ANSWER BACK CONTROL RELAY

BUSY BREAK GENERATION RELAY

INVENTOR
HENRY A. KAFITZ
BY J. J. Hamill
ATTORNEY

AUTOMATIC LINE SWITCHING SYSTEM

Filed Dec. 3, 1962

INVENTOR
HENRY A. KAFITZ

BY [signature]

ATTORNEY

CONNECTOR PANEL CIRCUIT

SEQUENCE CIRCUIT

INVENTOR
HENRY A. KAFITZ
BY J. O. Hamill
ATTORNEY

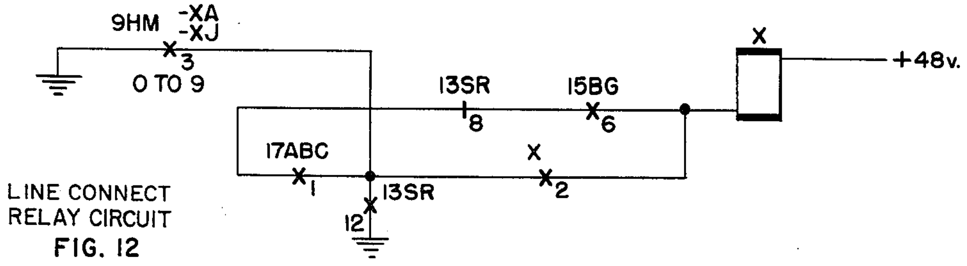
LINE CONNECT RELAY CIRCUIT FIG. 12
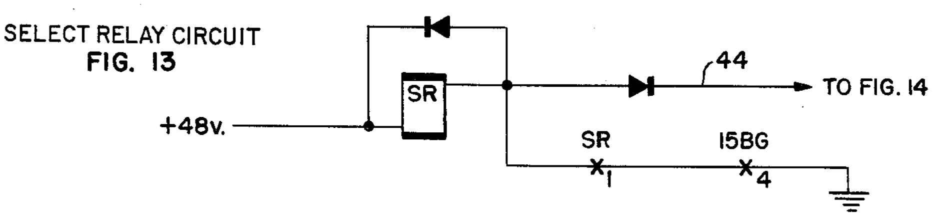
SELECT RELAY CIRCUIT FIG. 13
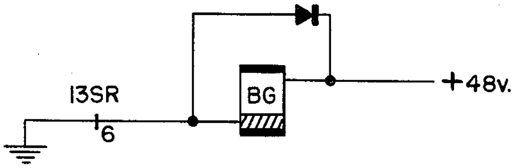
BREAK GENERATING RELAY CIRCUIT FIG. 15
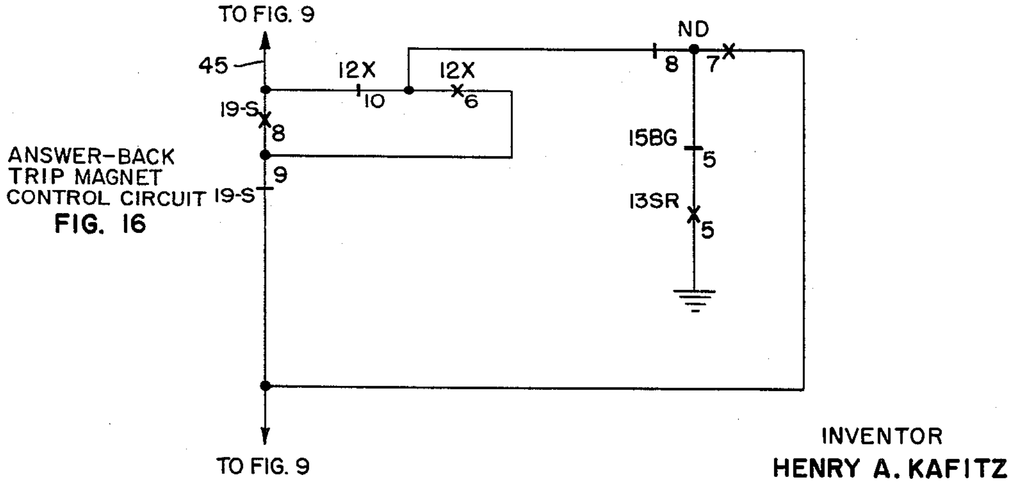
ANSWER-BACK TRIP MAGNET CONTROL CIRCUIT FIG. 16
INVENTOR
HENRY A. KAFITZ
BY J.J. Hamill
ATTORNEY United States Patent Office 3,251,929
Patented May 17, 1966

3,251,929
AUTOMATIC LINE SWITCHING SYSTEM
Henry A. Kafitz, Chicago, Ill., assignor to Teletype Corporation, Skokie, Ill., a corporation of Delaware
Filed Dec. 3, 1962, Ser. No. 242,008
13 Claims. (Cl. 178—2)

This invention relates to printing telegraphy and more particularly to printing telegraph switching systems.

The present invention is particularly adapted for small, automatic, line switching systems for private lines of state, county and local government agencies and for private commercial lines in that the system features an unattended, central switching office that is completely packaged in two cabinets and is capable of interconnecting any two stations of a plurality of stations connected thereto whether the stations are on the same station line or are on different station lines.

The present system does not contemplate that there be any particular type of equipment employed in the outlying stations for transmitting and/or receiving, but that the outlying stations employ any of the well known transmitters or any well known receivers. In the embodiment of the invention described herein printing telegraph page printers of the well known type are employed for transmitting and/or receiving messages. Preferably, the transmitting page printers utilize the line break keys that are standard equipment of most keyboards for seizing and releasing the switching centers. However, as should be apparent to those skilled in this art, other types of receivers and transmitters could be substituted for these page printers and signals other than the line break signal could be successfully employed in this type of switching system for seizing and releasing the switching center.

Accordingly, it is an object of the present invention to provide a new and improved line switching system having an unattended switching center for interconnecting any two stations served by the system.

Another object of the invention is to provide a line switching system having an unattended, automatic, switching center wherein a station on a line may communicate with another station on the same line or may communicate with stations on other lines on a noninterrupted basis.

A further object is to provide an unattended, automatic line switching system having switches to interconnect any two lines and signify to all of the other lines that these lines are busy and to signify to a calling line that a given multi-station line is busy when two stations thereon are communicating one with another.

A still further object is to provide an unattended, automatic line switching center having switch contacts for interconnecting lines in response to call directing codes and operable in response to a calling station's own line designation to render that line unavailable for interconnection to other lines and to signify that the called line is busy.

A final object of this invention is to provide a line switching system having a switching center that renders a multi-station line unavailable to other lines when one station on a line is communicating with another station on the same line and wherein the switching center also prevents reflection of the communication back to the multi-station line through the switching center.

According to the preferred embodiment of the invention there is provided a self-contained switching center to which a number of outlying station lines may readily be connected. Each station line may have thereon a plurality of transmitting and/or receiving stations for communicating with any other station served by the switching center. The switching center includes a cross bar switching means and a sequential selector. The sequential selector analyzes the station call directing codes and causes the cross bar switching means to complete a connection between the calling line circuit and the called line circuit and in response to an end-of-address code releases the switching center for reception of other call directing codes. When a calling line circuit transmits its own line circuit's call directing code, a cross bar switch contact associated with this line circuit is closed and causes the energization of a line relay that indicates that this line circuit is now busy thereby preventing the connection thereto by any other line circuit until release of the cross bar switch contact. A further relay at the switching center has contacts, in the switching circuitry, to prevent the signals being communicated over an incoming line circuit from being reflected and returned over the incoming line thereby to prevent a garbling or mixing with the incoming signals.

If the called line circuit is not idle or "busy," the line switching center automatically transmits a signal indicative of this fact and then proceeds to automatically disconnect the calling line circuit from the line switching center.

A more complete understanding of the invention will be had from the following detailed description when considered in conjunction with the accompanying drawings, wherein:

FIG. 12 is a detached contact schematic view of a line relay circuit;

FIG. 13 is a detached contact schematic view of a select relay circuit;

FIG. 15 is a detached contact schematic view of the circuit for a break generating relay;

FIG. 16 is a detached contact schematic view showing circuits leading to the answer-back trip magnets;

*General description*

Figure 1:
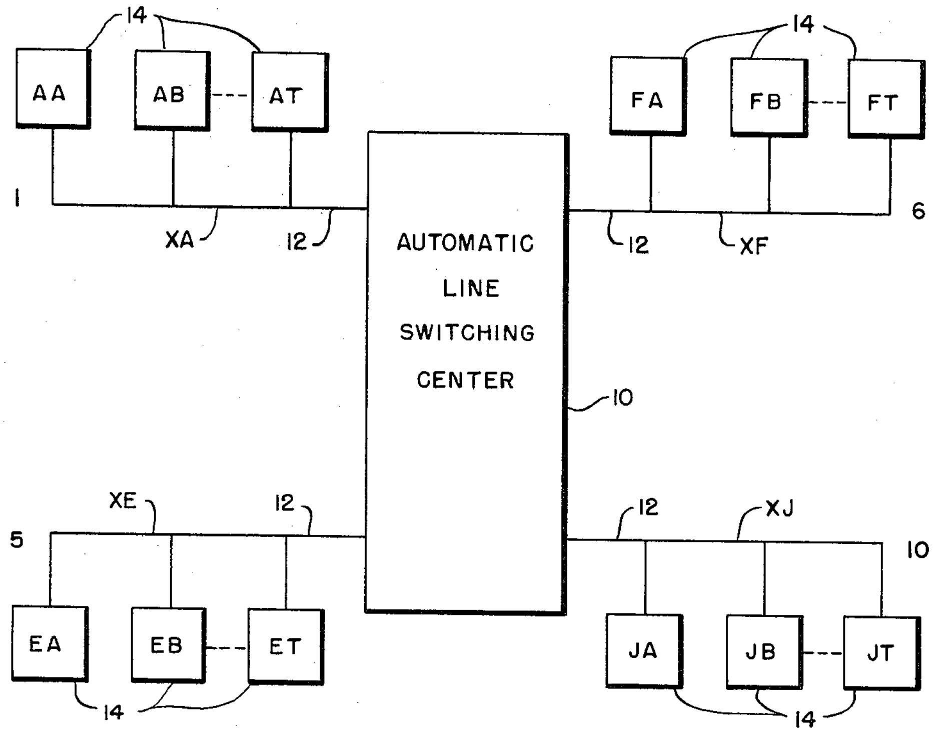
FIG. 1 is a block diagram showing the multi-station lines connected to the automatic switching center.

Referring now to the drawings and more particularly to the block diagram of FIG. 1, there is shown a central switching center 10, which has radiating therefrom, a number of half duplex signal lines 12 upon which are located a plurality of transmitting and/or receiving stations 14. Each of the circuits is designated by individual call directing codes such as XA, XB, XC . . . XJ and each of the stations on a given line is designated by a two-letter code, the first letter of which, is the same as the last letter of the circuit call directing code. The system is so arranged that any station 14 on any one of the circuit lines 12 may communicate with a station 14 on the same circuit line 12 or with a station 14 on another circuit line 12 by going through the central switching center 10.

The central switching center 10 is a self-contained, automatic, unattended switching center 10 in that no operator is required to interconnect line circuits 12 and that line circuits 12 can readily be connected thereto or disconnected therefrom merely by plugging or unplugging a line circuit 14 into the line switching center 10. The number of circuits capable of being handled is, of course, limited by the number of cross bar switches provided at the switching center 10. For the purpose of illustration, only one cross bar switch is shown and it is capable of handling 10 line circuits. In commercial units, four cross bar switches capable of handling 20 circuits are normally employed and installed in two cabinets with their associated relay panels.

The present switching center 10 provides for the interconnection of line circuits, e.g., line switching rather than the reproduction of the message in the switching center and the later transmittal of the message from the switching center to the outlying station as in a message switching system.

Each of the outlying stations is preferably equipped with a standard, commercially available, page printer set which is capable of sending and receiving messages. It is preferred that each of the page printers has its keyboard equipped with a line break key, which is standard equipment on most page printer sets. However, this is not to be construed as a limitation since other recording and/or transmitting devices could be provided in lieu of page printers.

Before any messages are transmitted either to a station on the caller's own line circuit or to a station on a different line circuit, the central switching center 10 should be contacted. In the case of a station calling another station or stations on a different line circuit, it is necessary that the switching center 10 be contacted so that the interconnection may be made between the two line circuits for completion of the call. When calling a station on the same line circuit as the originating station's line circuit, the switching center 10 should be contacted to render this line circuit busy to all other line circuits so that the central switching center 10 does not connect another line in circuit to the line circuit on which two stations are already in communication.

To contact and seize the switching center 10 and thus render it unavailable to other circuits until such time as the connection by the switching center has been completed, an operator at an outlying station 14 will depress the line break key on the keyboard of the page printer set for approximately three seconds. A line break signal of one-half second duration or longer is recognized by the switching center as a bid for access to the switching center 10 and is recognized by the page printer of the calling station 14 and the other printers 14 on the same circuit as a selective non-print condition wherein the motors of the printers on this line are energized.

If the central switching center 10 is not in the process of making other connections, the calling station will receive a signal "GA" (go ahead) on his printer from the switching center 10, indicating that the switching center 10 is available for the call directing code of the receiving station. However, if the switching center 10 is in the process of making other connections a go ahead signal "GA" will not be forthcoming and this signifies to the operator that the switching center 10 is busy and that the operator should try to place the call again at a later time.

After receipt of the go ahead signal "GA," the operator then transmits his station's own station designation to place his printer in the printing position and thereafter transmits the call directing code of the line circuit to which the operator desires to be connected. At the switching center 10 the call directing codes are analyzed by a sequential selector unit LS which closes a contact corresponding to the called circuit in the line switching relay circuitry whereupon the called circuit is interconnected by the cross bar switch network to the calling circuit. The switching center then transmits a confirmatory signal, another go ahead "GA," to the calling station which then can either transmit the call directing code of another circuit to perform a multi-circuit call, or alternatively, transmit the station identifying code of the station on the called circuit so that a page printer on that circuit may be selectively called.

After receipt of the confirmatory signal after the last call directing code for the line circuits, the operator at the calling station, if all stations on that line circuit are to receive the message, signifies the end-of-address to the switching center by transmitting an end-of-address code (CR–LF) and it will be assumed that this situation prevails here. The switching center 10 recognizes this end-of-address code and renders itself available to other stations for establishing connections between any circuits that are not interconnected. The calling operator then may transmit the message to the interconnected called circuit or circuits. After transmission of the message the operator again depresses the line break key for at least one-half of a second duration to produce an end-of-message signal which is recognized as such by the central switching center 10. The switching center 10 disconnects the connection between the called line circuit and calling line circuit whereupon the printers at the calling and called stations time out and shut down and await further operation.

If the called circuit had been busy when the calling circuit had asked the central switching center 10 for connection to the called circuit, the central switching center 10 would have sent back a code combination, LTRS, B, Z, followed by a line break signal that would automatically disconnect the calling station from the central switching center.

When calling another station on the same line circuit, the calling operator merely transmits his own circuit's call directing code as the desired address, whereupon the central switching center 10 energizes a relay associated with that circuit to report that this circuit is busy to any further requests. The operation is then the same as for any other message to a station on another circuit.

Figure 3:
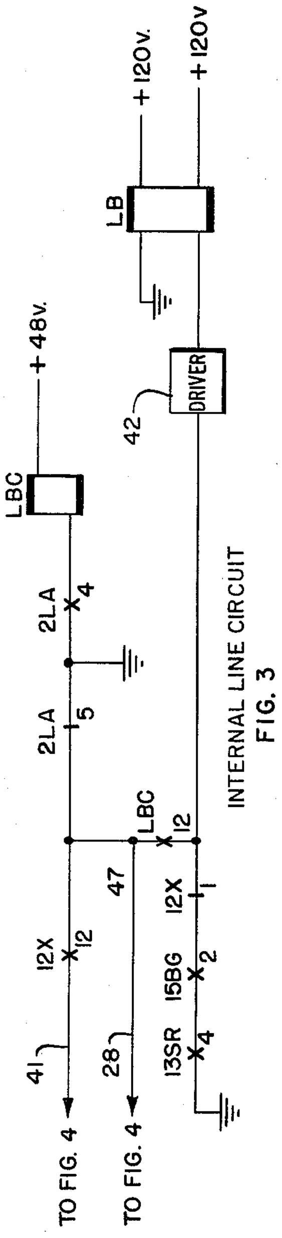
FIG. 3 is a detached schematic circuit view showing an internal line circuit.
Figure 5:
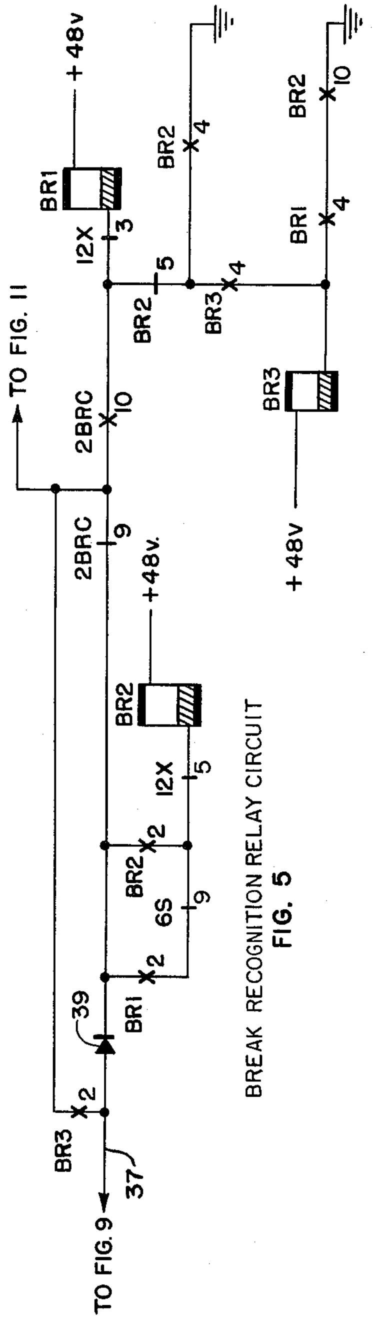
FIG. 5 is a detached contact schematic view of break recognition relay circuits.
Figure 4:
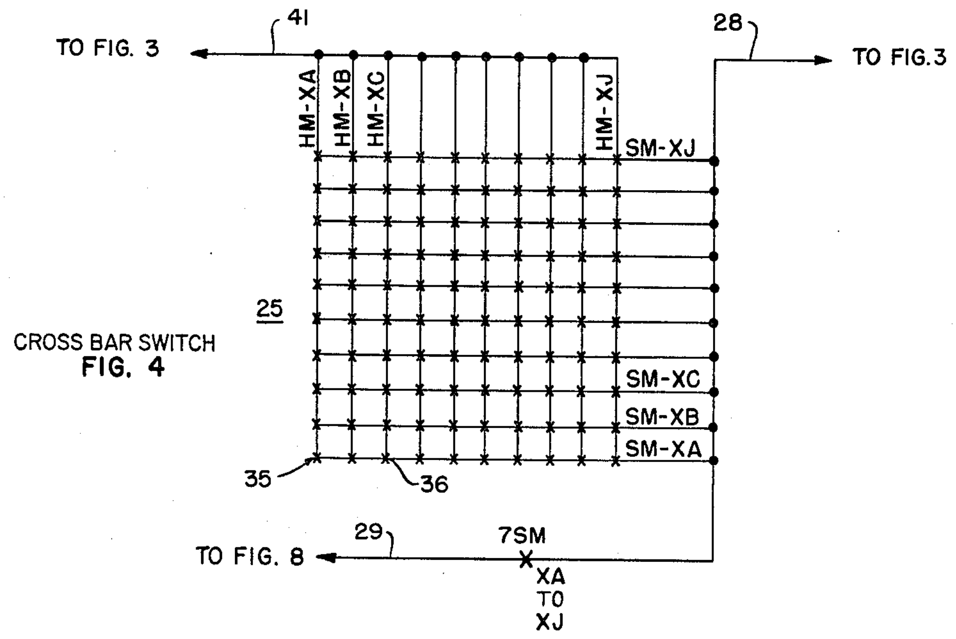
FIG. 4 is a schematic illustration of the cross point contacts of a cross bar switch.
Figure 17:
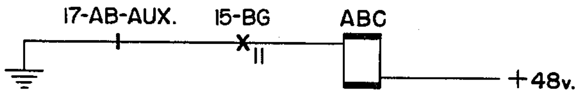
FIG. 17 is a detached contact schematic view of the circuit of an answer-back control relay.
Figure 18:
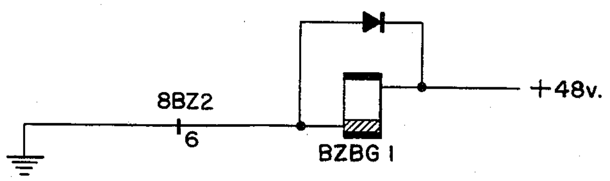
FIG. 18 is a detached contact schematic view of the circuitry for a busy break generating relay.

Each of the signal line circuits XA–XJ, inclusive, is connected, at the switching center 10, with an individually associated internal line circuit that contains a plurality of relays on a circuit panel and these internal line circuits serve to function as a connecting circuit between each of the signal line circuits XA–XJ and the cross bar switching network schematically illustrated in FIG. 4. Each of the internal line circuits has an outgoing line relay LB (FIG. 3) having contacts in its associated signal line circuit to generate the line signals for its associated signal line circuit in response to the line signals received by the outgoing line relay. A control relay in each of the internal line circuits prevents the outgoing line relay from responding to line signals originating on its associated line circuit.

Since each signal line and internal line circuit within line switching center 10 is identical, only one of each signal line and internal line circuit has been illustrated. As should be apparent from the following description, the operation of the other signal line and internal line circuits will proceed in exactly the same manner. The cross bar switching network, sequential selector LS, and the answer-back mechanisms No. 1 and No. 2 for transmitting the go ahead "GA" signals and busy "BZ" signals are common to all of the line circuits XA–XJ and will be so specified in the following detailed description.

*Detailed description*

The "detached contacts" method of exposition used in Patent No. 2,722,675, granted to J. Michal et al. on November 1, 1955, has been adopted for use in the present disclosure. In the detached contact method, relay contacts generally are not adjacent to their magnetic core and windings but are separated or detached therefrom. For example, a core such as the core of the select relay shown in FIG. 13 is represented by a small rectangle and given the designation "SR."

In the specification this relay is referred to as 13–SR, where "13" indicates the figure number of the drawing on which the core is located and "SR" signifies "select relay" as a functional designation of the relay. On the drawing each of the contacts controlled by the relay shown on the same figure with the winding is given a designation such as, for example, "SR–1" placed in proximity to the contact where the "SR" indicates that the contacts are controlled by the windings of the relay "SR" located on the same figure. When the relay also has contacts located on another figure of the drawing, the contacts are given a compound designation such for example, as "13–SR–6," wherein "13" indicates the figure number of the drawing on which the core is located and "6" is the number of the contact pair. In the specification the contacts are referred to as 15–13–SR–6, where "15" indicates the figure number of the drawing on which the contacts are located, "13" indicates the figure of the drawing on which the core is located, "SR" is the functional designation and "6" is the contact number.

The contacts which are closed when the relay is deenergized, known as "break" contacts, are represented by a short line perpendicular to the line representing the conductor, while contacts which are closed when the relay is energized, known as "make" contacts, are represented by two short crossed lines diagonally intersecting the conductor line. The signal generating contacts of the answer-back mechanism are designated in a manner similar to that used in designating relay contacts as are the contacts operable by a manual switch N–D and by a sequential selector LS except that no numeral is given for the non-existent core. In some instances where the complete function of a circuit cannot be shown in a single figure due to the fact that there is interaction between its functional operation and the functional operations of other portions of the apparatus, a terminal is shown by a simple arrow with a reference indicating the figure on which the continuation of this circuit is presented.

Before proceeding with the detailed description of the various operations of the relays provided at the line switching center 10, it should be first understood that the relays and the contacts operated thereby are shown in the state at which no power has been applied to the line switching center 10. Upon application of the power, the relays at the line switching package will be in the following states: break recognition control relay 2–BRC energized, line relay 2–LA energized, line relay 3–LB energized, outgoing line control relay 3–LBC energized, break recognition relay 5–BR1 energized, break recognition relay 5–BR2 de-energized, break recognition relay 5–BR3 de-energized, select control relay 6–SC de-energized, select relay 19–S de-energized, line select relay 13–SR de-energized, break generating relay 15–BG energized, line connecting relay 12–X de-energized, answer-back control relay 17–ABC energized, busy control relay 8–BZ de-energized, busy break generating relay 18–BZBG1 energized, and busy break generating relay 7–BZBG2 de-energized.

Figure 2:
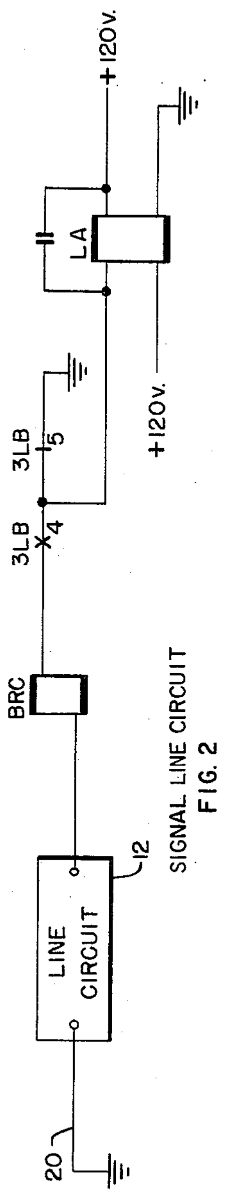
FIG. 2 is a detached schematic view showing a signal line circuit.

Referring now to the drawings and more particularly to FIG. 2, an incoming line circuit 12 is shown connected to a conductor 20 leading to a common ground provided within the line switching center 10 and connected to positive battery through a path extending from positive battery to the upper side of the coil of the relay LA through now closed make contact 2–3–LB–4, and the coil of the relay 2–BRC. The make contacts 2–3–LB–4 are controlled by the outgoing line relay 3–LB and are closed when the line circuit 12 is idle to provide the usual marking condition on its signal line circuit. Conversely, when the line relay 3–LB de-energizes and opens its make contact 2–3–LB–4 and closes its break contact 2–3–LB–5, the path to positive potential is broken and the line circuit 12 will be in an open line or spacing condition. This open line condition of a long duration, one-half second or more, will hereinafter be referred to as a "line break" signal.

Before turning to a specific example of placing calls to another station either on one's own signal line circuit 12 or on another signal line circuit 12, it is thought best to clearly establish what constitutes a signal line circuit such as XA and an internal line circuit associated with a signal line circuit. As used herein, a signal circuit line XA, XB . . . or XJ refers to a circuit shown in FIG. 2, having a line circuit 12 extending outwardly therefrom and designated by a rectangle designated 12 and two relays 2–BRC and 2–LA located at the switching center that monitor the associated incoming line circuit 12.

Each signal line circuit XA to XI has an associated internal line circuit in the switching center 10 for interconnection to any other internal line circuit through a cross bar switch network 33. As seen in FIG. 3, an internal circuit extends from ground, through break contacts 3–2–LA–5 and over lead 47 to make contacts 3–LBC–12 and through a driver 31 and an outgoing line relay 3–LB to a source of positive potential. Each internal line circuit is connected to horizontal contact points of the associated cross bar switches by a lead 28 and is connected to the vertical contact points of the associated cross bar switches by a lead 41 having normally open make contacts 3–12–X–12 therein.

The incoming signals on a given internal circuit are denied access to the outgoing line relay 3–LB on that internal line by make contacts 3–LBC–12 which are operated by the fast acting relay 3–LBC operating in the same rhythm as the contacts 3–2–LA–5 and 3–2–LA–4. That is, when the incoming line relay 2–LA is receiving a marking signal, the incoming line relay 2–LA energizes and closes its marking contact 3–2–LA–4 to energize relay 3–LBC. Relay 3–LBC closes its break contact 3–LBC–12, but break contact 3–2–LA–5 opened therewith to prevent ground from reaching the outgoing driver 42 and turning off line relay 3–LB. When a spacing condition occurs, line relay 2–LA de-energizes and opens make contact 3–2–LA–4 to de-energize relay 3–LBC thereby opening make contact 3–LBC–12 to prevent ground from reaching driver 42 and turning off line relay 3–LB. Thus, line relay 3–LB stays in the marking condition and does not reflect the signals back to its own signal line. It should be noted that all other circuits, i.e., those awaiting interconnection to the calling station, have their respective line relays 2–LA energized due to the marking conditions on their respective lines and also have their respective control relays 3–LBC energized and contacts 3–LBC–12 closed to prepare a path from the cross bar switching network over lead 41, through contacts 3–12–X–12, and lead 47 to the driver 42 for their respective line relays 3–LB and thus respond to marking and spacing signals upon operation of the line connect relay 12–X.

With a line circuit in an idle condition, i.e. with marking current thereon, the depression by an operator of a line break key at a station on the line circuit 12 acts as a bid for connection to the switching center 10 and causes a break in the path extending from ground shown at FIG. 2 to the positive battery on the upper side of the line relay 2–LA whereupon the break recognition control relay 2–BRC and incoming line relay 2–LA on the internal circuit of the line switching center 10 associated with the line circuit 12 are de-energized.

Concurrent with the operation of the line break key and the release of relay break recognition control relay 2–BRC, the motor of the page printer at the calling station on the calling line circuit will turn on, as will all other printer motors at each of the other stations on that line since these page printers are equipped with conventional break recognition control circuits for turning on their motors.

The break recognition control relay 2–BRC recognizes a line break as a bid for the switching apparatus at the line switching center 10 and to distinguish a line break duration of extended duration such as one-half second or more from that inadvertently caused by some malfunction on the line circuit, the break recognition control relay operates three timing and controlling relays which are break recognition relays 5–BR1, 5–BR2 and 5–BR3.

While break recognition control relay 2–BRC was operated, break recognition relay 5–BR1 also was operated over a path extending from positive potential coil of relay 5–BR1, now closed break contact 12–X–3, now closed make contact 5–2–BRC–10 to ground. Upon the release of break recognition control relay 2–BRC, this aforementioned energizing circuit for break recognition relay 5–BR1 is broken by the opening of contacts 5–2–BRC–10. The BR1 relay, however, is a slow release type of relay and before it releases, another slow release break recognition relay, relay BR2, is operated over a path extending from ground (FIG. 11), now closed break contact 5–2–BRC–9, now closed make contacts 5–BR1–2, now closed break contacts 5–6–S–9, now closed break contacts 5–12–X–5, coil of relay BR2 to positive potential. Operation of relay 5–BR2 completes the operating circuit of the third break recognition relay 5–BR3 which operates over a path extending from ground, now closed make contact 5–BR2–10, now closed make contact 5–BR1–4 and the coil of relay BR3 to positive potential. The holding circuits for relays 5–BR2 and 5–BR3 are as follows: For relay 5–BR2, its holding circuit may be traced from ground (FIG. 11), now closed break contact 5–2–BRC–9, now closed make contact 5–BR2–2, now closed break contact 5–12–X–5, coil of relay BR2 to positive potential, and the holding circuit relay 5–BR3 may be traced from ground through now closed make contact 5–BR2–4, now closed make contacts 5–BR3–4, and the coil of relay BR3 to positive potential.

If the line break signal is of at least one-half second duration, the slow release relay 5–BR1 will have sufficient time in which to de-energize and thereby prepare the path for a select control relay 6–SC. If there were a line break of less than one-half second duration, it would normally be due to some faulty operation on the line rather than a deliberate bid of an operator from an outlying stations at the switching center, and hence, the relay 5–BR1 would begin to release and then would become fully operated again since the line break of less than one-half second duration would operate relay 2–BRC and close make contacts 2–BRC–10 in the operating circuit of relay 5–BR1. The function of the select control relay 6–SC is to prepare the operating path of a select relay 19–S that controls the operation of the selector magnets 7–SM which in turn operate the horizontal switches of the cross bar switch network.

To assure that the line switching center 10 is not already in the process of connecting one line circuit 12 to another line circuit 12 and hence, the common facilities of the line switching center 10 already in operation, the operating circuit for the selector control relay 6–SC includes a chain of normally closed relay contacts 10–19–S–6. If the select relay 19–S associated with any of the line circuits XA–XJ is operated, its normally closed contact 10–19–S–6 is opened and breaks the chain of contacts extending from ground potential in FIG. 10 to the operating coil of the selector control relay 6–SC over a path traced hereinafter. Hence, the select relay 19–S will not be able to operate to cause the energization of the selector magnets 7–SM associated with a given signal line circuit until all the contacts in the chain of contacts 10–19–S–6 are closed. Each of the contacts 10–19–S–6 can be shunted by the closure of a manual switch 25 which is closed when the associated line circuit is disconnected from the line switching center 10.

Figures 10, 14:
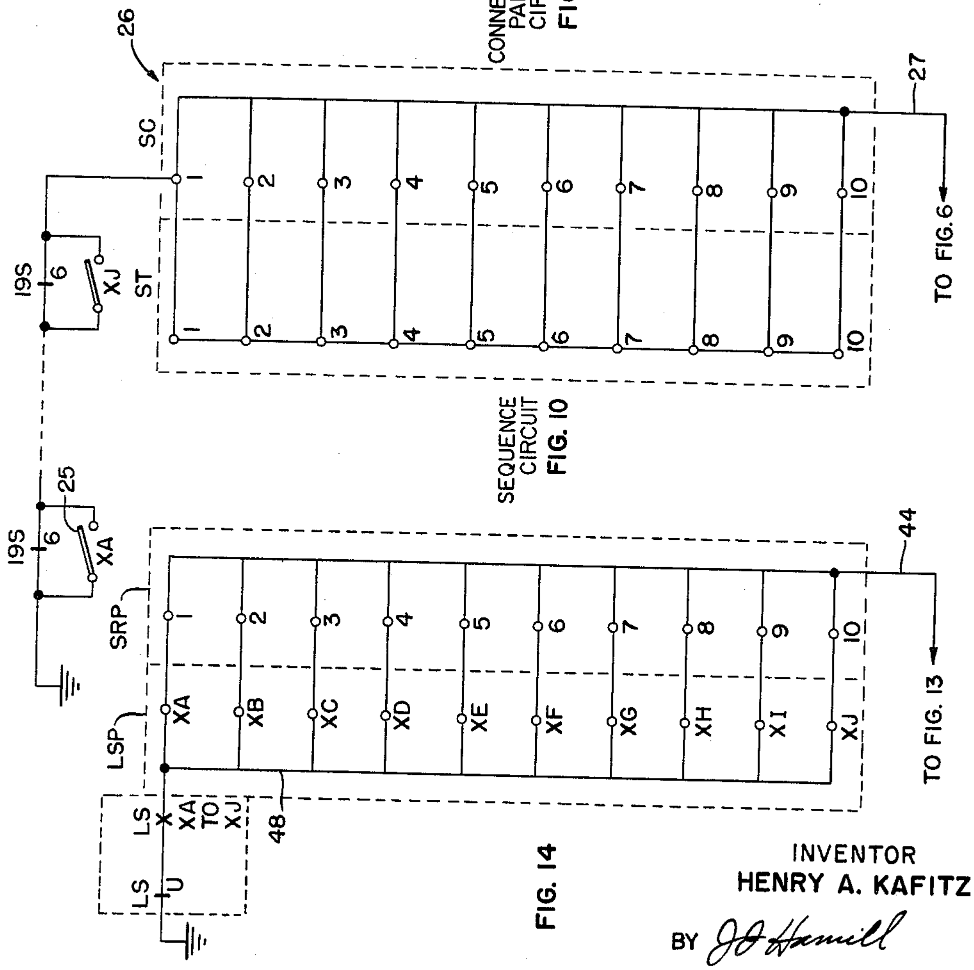
FIG. 10 is a detached contact schematic circuit view showing a sequence circuit connected to a select control connector panel.
FIG. 14 is a detached contact schematic view containing a sequential selector connector panel and a select relay control panel circuit.

The energizing circuits for the select control relay 6–SC extends from ground potential in FIG. 10 through each of the now closed contacts 10–19–S–6 of the chain of contacts associated with signal line circuits XA–XJ and then to the No. 1 connector position on a circuit control plugboard SC designated by the general number 26. As seen in FIG. 10, the No. 1 connector on plugboard SC is connected to a common conductor 27 which leads to a normally closed contact 6–5–BR1–5, now closed make contact 6–5–BR2–6, now closed make contact 6–5–BR3–6, now closed break contact 6–12–X–7, the coil of relay 6–SC to a source of positive potential. Upon operation, select relay 6–SC locks to ground potential through now closed contacts CR–LF operable by the sequential selector unit LS, now closed make contacts 6–5–BR3–8 or alternatively now closed break contacts 6–5–BR1–9—whichever one at this time is in the proper state—the now closed make contact 6–SC–6, the coil of the circuit control relay 6–SC to a positive source of potential.

The operation of the circuit control relay 6–SC removes an electrical shunt from around the coil of the select relay 19–S by opening the normally closed break contact 19–6–SC–7 to break this shunt path across the select 19–S thereby completing an obvious circuit for operating the relay 19–S. Operation of the select relay 19–S completes an operating path for operation of the cross bar selector magnets 7–SM associated with the incoming signal line circuit over a circuit path extending from ground through now closed break contact 7–19–S–4, the coils of the selector magnets 7–SM to positive potential. The operation of the cross bar selecting magnets 7–SM–XA associated with the signal line circuit XA completes a connection of the selector portion of the line switching center (FIG. 8) to the internal line circuit (FIG. 3) associated with the signal line circuit XA. This connection may be traced from ground through incoming line relay contacts 3–2–LA–5, lead 47, lead 28, now closed make contact 4–7–SM, lead 29, lead 30 to driver amplifier 31 and the upper coil of the sequential selector magnet 8–LS to a source of positive potential.

By this time the operator at the originating station on line circuit XA will have released the break key whereupon relay 2–BRC will have operated to complete the aforementioned operating circuit for break recognition relay 5–BR1 through now closed make contacts 5–2–BRC–10.

Operation of the relay 2–BRC also opened break contact 5–2–BRC–9 to break the energizing path of relay 5–BR2 which is also a slow release type of relay that takes approximately one-half second to release as does slow release relay 5–BR1.

Figure 11:
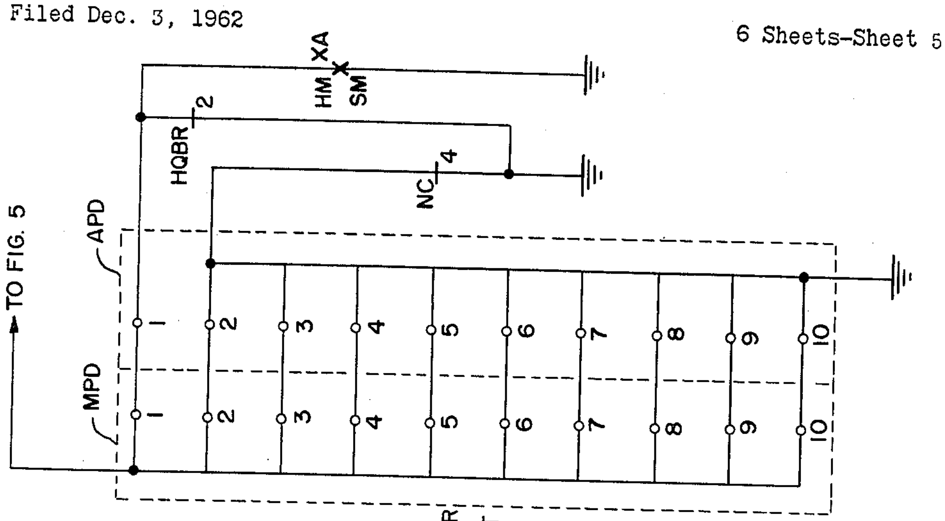
FIG. 11 is a detached contact schematic view showing interconnection between connector panels and ground potential.

While the break recognition relay 5–BR2 is releasing to signify that the line circuit XA is again in an idle or marking condition, an operating circuit is being completed to the vertical holding magnets 9–HM–XA of the cross bar switch 35 associated therewith to close a cross point contact associated with both the vertical operated by vertical holding magnet 9–HM–XA and the horizontal already operated by selector magnet 7–SM–XA. The operating circuit for the holding magnets 9–HM–XA extends from ground potential, now closed make contact 9–19–S–2, now closed make contact 9–5–BR1–8, now closed make contact 9–5–BR3–10, now closed break contact 9–5–BR2–9, now closed break contact 8–ND–13, the coil of the vertical holding magnet 9–HM–XA to positive potential. Operation of the holding magnet 9–HM–XA completes a holding circuit therefor extending from positive potential, the coil of the holding magnet 9–HM–XA, now closed break contact 9–HM–XA, now closed break contact 8–ND–XA, lead 37, through now closed make contact 5–BR3–2 to ground (FIG. 11) or alternatively from lead 37 through the diode 39 and break contact 5–2–BRC–9 to ground (FIG. 11). Also, the holding circuit may proceed over lead 37 and diode 39 and through now closed break contact 5–2–BRC–9 to the No. 1 conductor of the circuit panel MPD (FIG. 11) through connector No. 1 terminal board APD through a headquarters break key contact 11–HQBR–2 to ground or from terminal No. 1 of the terminal board APD through cross bar switching contact 11–9–HM–XA to ground.

Before the answer-back signal can be transmitted it is necessary that the line relay 12–X be operated to close its make contact 3–12–X–12 to complete the circuit from the answer-back signal generator 40 to the line relay 3–LB. Operation of the vertical holding magnet 9–HM–XA completes the operating circuit for the line relay 12–X extending from ground through now closed make contact 9–HM–XA–3, the make contact 12–17–ABC–1, now closed break contact 12–13–SR–8, now closed make contact 12–15–BG–6, the coil of the X relay to positive potential. The holding circuit of the line relay 12–X extends from ground, now closed make contact 9–HM–XA, now closed make contact 12–X–2, coil of the X relay to positive potential.

Figures 6, 7, 8, 8A, 9, 19:
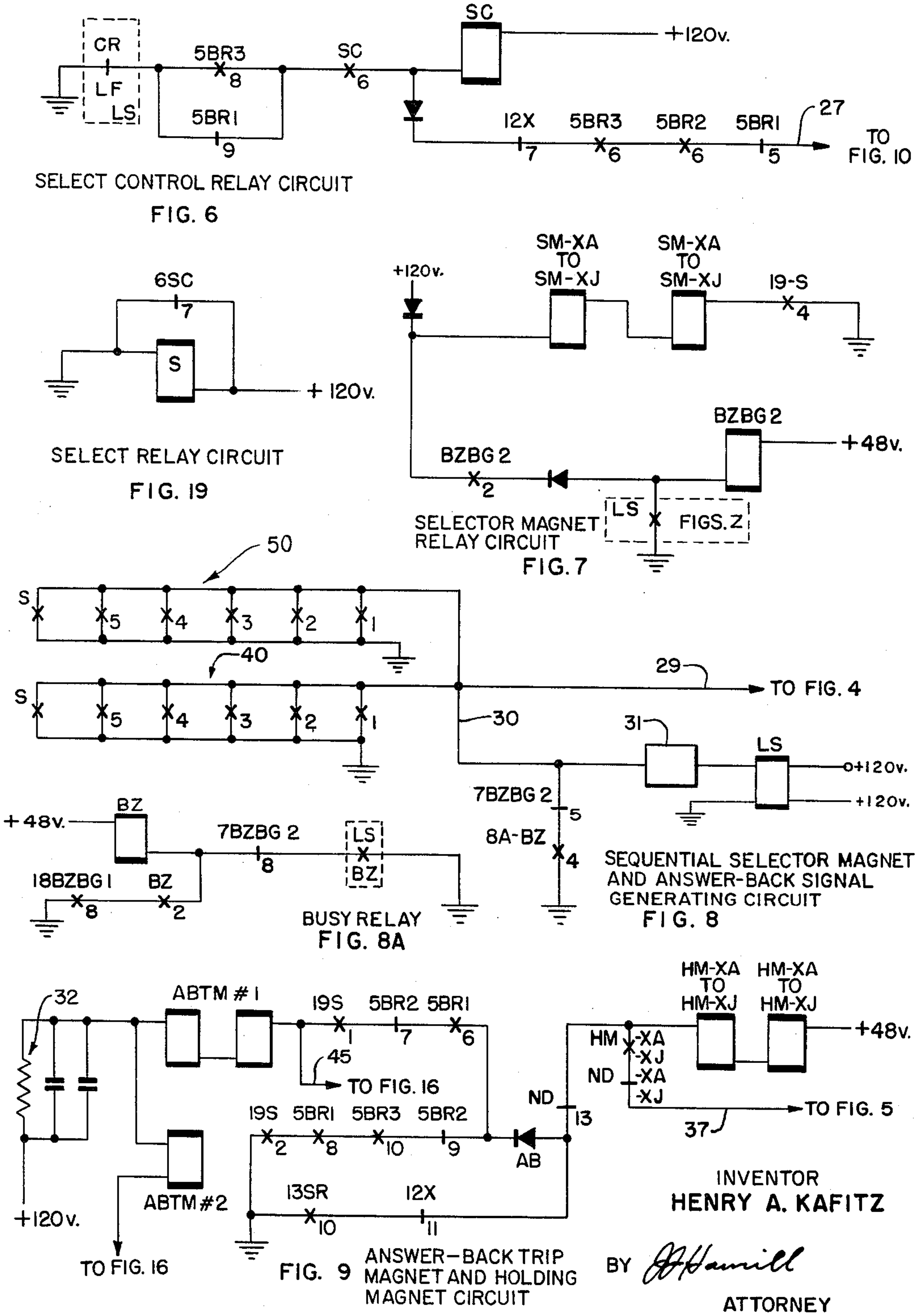
FIG. 6 is a detached contact schematic view of a control relay circuit.
FIG. 7 is the detached contact schematic view of a selector magnet relay circuit for the cross bar switch.
FIG. 8 is a detached contact schematic view of a sequential selector magnet and the answer-back signal generator circuits.
FIG. 8A is a detached contact schematic view of the busy relay circuit.
FIG. 9 is a detached contact schematic view showing holding magnets for the cross bar switch and the answer-back trip magnet circuit.
FIG. 19 is a detached contact schematic view of the circuitry for a select relay.

The operation of holding magnet 9–HM–XA and closing of associated cross point contact 35 of the cross bar switch 25 completes a circuit to the outgoing line relay 3–LB from the answer-back signal generator 40 shown in FIG. 8. The answer-back signal generator 40 is a schematic representation of a well known answer-back type of mechanism having a rotary drum which is released for operation upon the energization of its associated answer-back trip magnet. To release the answer-back mechanism and to generate the go ahead signal "GA" signifying to the transmitting station that the bid for the line switching center 10 has been successful, and operating circuit is completed for the answer-back trip magnet 9–ABTM #1 over a path extending from ground potential, now closed make contact 9–19–S–2, now closed make contact 9–5–BR1–8, now closed make contact 9–5–BR3–10, now closed break contact 9–5–BR2–9, now closed make contact 9–5–BR1–6, now closed break contact 9–5–BR2–7, now closed make contact 9–19–S–1 and the coil of the No. 1 answer-back trip magnet 9–ABTM #1 and through a resistor capacitor network 32 to a source of positive potential. The answer-back trip magnet 9–ABTM #1 need not be held energized since the trip magnet 9–ABTM #1 releases the answer-back mechanism for one complete cycle of signal generation that furnishes the "GA" signal to the contacts of the signal generator 40 shown in FIG. 8 which transmits its sequential signals in a path from ground in FIG. 8 through the break contacts Nos. S1, S2, S3, S4 or S5, lead 29, now closed make contact 4–7–SM–XA through the now closed cross bar switch cross-point contacts 35, over lead 41 through now closed make contact 3–12–X–12, now closed make contact 3–LBC–12, to driver 42 that drives the line relay 3–LB. Operation of the line relay 3–LB causes its marking and spacing contacts 2–3–LB–4 and 2–3–LB–5 to operate in the signal line circuit XA.

The relay 12–X is the relay whose function it is to signify to all other lines trying to contact its associated signal line circuit XA that the line XA is not available, i.e., busy, during the duration of the connection of its associated line circuit XA through the cross bar switch 25. Also, the relay 12–X opens its break contact 5–12–X–3 in the energizing circuit of the break recognition relay 5–BR1 to release this slow release relay and also opens its normally closed contact 5–12–X–5 in the operating and holding paths for the break recognition relay 5–BR2. Operation of relay 12–X also opens the normally closed contacts 6–12–X–7 which are in the operating circuit of the circuit control relay 6–SC. The relay 6–SC remains operated, however, when the break recognition relays 5–BR3 and 5–BR1 are de-energized, an alternative holding circuit for the relay 6–SC being established through the now closed break contact 6–5–BR1–9.

*Request by outlying stations for interconnection to a circuit*

With the selector portion of the line switching center 10 connected to the signal line circuit XA on which line circuit is the calling station, e.g. station AA, the operator at the calling station may now keyboard the call directing code of the line circuit desired. The operator may request any of the signal line circuits XA–XJ including his own line circuit in the event that he wishes to communicate with another station on his own line circuit and have his own line circuit rendered busy by the line switching center 10 to the remaining signal line circuits XB–XJ.

For the present example, it is assumed that the operator on line XA desires a station on his own signal line circuit XA and hence operates his keyboard to transmit his own call directing code XA. The operator then awaits a confirmation signal from the switching package that the line is available and that an interconnection has been made. Of course, when one is calling one's own line the line circuit will not already be in use, but when one is calling another line circuit the other line circuit may already be in use in which event the operator of the calling station will receive a busy signal rather than the confirmation signal "GA."

The call directing code XA comes in over the signal line circuit XA and causes operation of the incoming line relay 2–LA which in turn operates its associated make and break contacts as it follows the incoming signals to impress the signals by its line contacts 3–2–LA–5 and 3–2–LA–4 which go over the conductor 28 through the now closed make contact 4–7–SM–XA and over lead 29 to lead 30 and amplifier 31 to the selector magnet 8–magnet 8–LS. The sequential selector LS in response to sequence of characters XA closes a contact 14–LS–XA identified therewith which is shown near the panel LSP shown in FIG. 14. This contact 14–LS–XA operates in conjunction with a universal timing contact 14–LS–U (in the sequential selector LS) to complete an operating circuit for the line selecting relay 13–SR associated with the circuit XA. This operating circuit is from ground in FIG. 14, now closed universal timing contact 14–LS–U in the sequential selector LS, the now closed make contact 14–LS–XA in the sequential selector LSP to the XA pin in line panel LS and to the No. 1 connector in the line panel SRP and thence over lead 44 through the coil of the relay 13–SR and to a source of positive potential. The holding circuit for the relay 13–SR may then be traced from ground potential, now closed make contact 13–15–BG–4, now closed make relay 13–SR–1 and coil of the select relay 13–SR to positive potential. The operation of the relay 13–SR causes the releasing of the break generating relay 15–BG due to the opening of break contacts 15–13–SR–6 in its obvious operating circuit. The break generating relay is also of slow release which restores to its unoperated position in approximately one-half second during which time the select relay 13–S will remain held up to perform the function of energizing the holding magnets 9–HM associated with the called circuit line, which is in this instance is the circuit line XA, and which, in this example, are also the same holding magnets 9–HM–XA that belong to the originating line circuit XA. As will be explained hereinafter in description of connecting to another line circuit, the operation of the select relay 13–SR completes an interconnection of cross-point contacts in the cross bar switch 25 to complete a circuit from one internal line circuit to another internal line circuit.

The release of the break generating relay 15–BG completes an operating circuit for the No. 1 answer-back trip magnet 9–ABTM #1 which will again cause the answer-back signal generator 40 (FIG. 8) to generate a confirmatory go ahead signal "GA" to the originating station on line circuit XA. The operating path for the answer-back trip magnet 9–ABTM #1 is from ground (FIG. 16), now closed to make contact 16–13–SR–5, now closed break contact 16–15–BG–5, now closed break contact 16–ND–8, the now closed make contact 16–12–X–6, now closed make contact 16–19–S–8, lead 45, the coils of the No. 1 answer-back trip magnets 9–ABTM #1 to positive potential. The go ahead answer-back signals are transmitted by the signal generator 40 (FIG. 8) out over the outgoing internal circuit previously traced to the outgoing line relay 3–LB for transmission by its contacts 2–3–LB–4 and 2–3–LB–5 in the signal line circuit XA. The line selector magnet 8–LS is also receiving the signals generated by the signal generator 40 over the lead 30 (FIG. 8) and upon receipt of the signal "G" of the go ahead signal "GA," the previous sequence of characters XA is broken and the contacts 14–LS–XA open to open the circuit of the selector relay 13–SR which included make contacts 14–LS–XA in the operating circuit therefor, previously traced. Release of the selector relay 13–SR also closes its break contact 15–13–SR–6 to re-establish the operating circuit of the break generating relay 15–BG.

Receipt of the go ahead signal "GA" by the calling station on the line XA signifies to the operator at station AA that his line circuit XA will be declared as being busy to the rest of the signal line circuits XB to XJ and confirms that he may now transmit his end-of-address code (CR, LF) to release the selector portion of the line switching center 10 for operation by other line circuits XB–XJ.

The receipt of the end-of-address code (CR, LF) by the selector magnet relay 8–LS in the selector unit causes the contacts 6–LS–CR, LF to open and break the previously traced holding circuit for the selector control relay 6–SC. Release of the select control relay 6–SC shunts the select relay 19–S as break contact 19–6–SC–7 closes to complete an obvious shunt path. Release of the select relay 19–S in turn opens its make contact 7–19–S–4 and breaks the holding circuit for the selector magnets 7–SM–XA thereby releasing the horizontals of the cross bar switch 25 associated with signal line circuit XA and hence the selector portion of the line switching center 10 is released from the circuit line XA.

The selector portion of the line switching center 10 has been released, but the holding magnets 9–HM–XA still retain cross-point contacts 35 closed and connected to the outgoing line relay 3–LB and also maintain the line relay 12–X of signal line circuit XA operated.

The calling station operator may now either identify himself by transmitting his own station's call letter, transmit the selective call letters of the station desired such as AB or begin the transmission of the text immediately to the desired station on his own line circuit XA.

Also, while the incoming signals over the line XA are being received by the line relay 2–LA associated with the line XA and are being repeated by its line relay contact 3–2–LA–4 and 3–2–LA–5, it will be recalled that these signals cannot be reflected over conductor 47 to the outgoing line relay 3–LB on the line circuit XA since the operation of the line relay 2–LA causes its contacts 3–2–LA–4 and 3–2–LA–5 to control the operation of the outgoing line control relay 3–LBC. The outgoing line control relay 3–LBC is a high speed relay which can open its contacts 3–LBC–12 in the same rhythm as the operation of the incoming line relay 2–LA to maintain driver 42 always energized. Thus, the outgoing line relay 3–LB does not de-energize in response to incoming signals and remains in the marking condition when its internal line circuit is receiving signals from its own signal line. However, it is to be understood that if the incoming line relay 2–LA were associated with another line circuit such as XB and the outgoing line relay 3–LB were associated with the line circuit XA, then there would be no rhythmic closure of the make contacts 3–2–LA–4 in the energizing circuit for the line control relay 3–LBC associated with the line XB. Hence, the outgoing line relay 3–LB associated with circuit XB would receive the message signals on a normal basis over internal line circuit associated with signal line circuit XA and the cross bar switch 25.

After transmitting the message, the operator at the originating station will transmit the end-of-message code which in the present instance is a "line break" signal of at least one-half second duration. This signal is identical to the "line break" signal which was sent as a bid for connection to the switching center. The "line break" signal could, of course, be transmitted by the receiving station, however, in usual practice it will be the operator at the transmitting station who will cause the disconnection of the circuits from the line switching center 10 following the transmission of the message text. The line break signal or the end-of-message signal is recognized by the break recognition control relay 2–BRC which due to the break in the signal line circuit XA releases. Release of the recognition control relay 2–BRC causes its make contact 5–2–BRC–10 to open thereby breaking the path to ground for break recognition control relay 5–BR3 causing relay 5–BR3 to release, the previous opening of the contacts 5–BR2–4 and 5–BR2–10 opening the other holding circuits for relay 5–BR3. It should be noted that the relay 5–BR3 is a slow release relay, so that it does not release in response to normal spacing signals which cause relay 2–BRC to release for intervals shorter than a "line break" signal.

After termination of the line break signal, the operating circuit for the break recognition relay 2–BRC is again completed whereupon it again energizes and causes its break contact 5–2–BRC–9 to open the last holding circuit for the holding magnets 9–HM–XA which holding circuit had been extending from positive potential through the coil of the holding magnet 9–HM–XA, through now closed break contact 9–HM–XA, through now closed break contact 9–ND–XA, over lead 37, through diode 39 to the now open contacts 5–2–BRC–9.

When the holding magnets 9–HM–XA de-energize this releases the verticals of the cross bar switch 25 and opens cross point contacts 35. Release of the holding magnets 9–HM–XA also opens make contact 12–9–HM–XA in the holding circuit of the line relay 12–X associated with the line XA. Hence, the line XA will no longer appear busy to other circuits attempting to reach this line circuit. The release of the line relay 12–X completes an operating circuit for the BR1 relay by closing its associated break contact 5–12–X–3, which operating circuit extends from ground potential (FIG. 11), through now closed make contact 5–2–BRC–10, now closed break contact 5–12–X–3 and the coil of the relay BR1 to positive potential. Thus, all of the relays associated with the line circuit XA are returned to their original condition and are awaiting the next bid for the line circuit XA.

*Station call from one circuit to another circuit*

When it is desired to call a station on a different line circuit, the operator will go through the previously traced operations to bid for the line switching center 10 and to establish connection of the sequential selector LS to the originating line for recept of the call directing code.

Thus, for the purpose of example, it will be assumed that an operator on the line XA has operated the break key for a one-half second duration and released the key and has received a go ahead signal "GA" from the line switching center 10 indicating that the line switching center 10 is now available for reception of call directing codes. If, for example, the operator on the line XA wishes to contact a station on a different line circuit such as line circuit XC, the operator of the on line XA will transmit the call directing code XC and await confirmation of connection thereto by the line switching center 10.

The call directing code XC comes in over the signal line circuit XA shown in FIG. 2 and operates the incoming line relay 2–LA to open and close its contacts 3–2–LA–4 and 3–2–LA–5. The sequential selector magnet 8–LS is connected to the signal line circuit XA and responds to the call directing code XC to close its make contacts 14–LS–XC. Upon closure of the universal contact 14–LS–U the select relay 13–SR is operated over a circuit extending from ground (FIG. 14), break contact 14–LS–U, make contact 14–LS–XC, line 48 in the line selector panel LSP to the connector XC and the pin and conductor 44 on the select relay panel SRP and thence to the coil of the select relay 13–SR and to positive potential. Operation of the select relay 13–SR opens its break contact 15–13–SR–6 in the operating circuit of the break generating circuit 15–BG, but before the break generating relay 15–BG takes its one-half second to de-energize, a holding path for the relay 13–SR will be maintained from ground potential, now closed contact 13–15–BG–4, and now closed make contact 13–SR–1, coil of relay 13–SR to positive potential. Operation of the select relay 13–SR completes a ground path to cause ground potential to be placed on the driver 42 associated with the line relay 3–LB to cause the driver 42 and hence the relay 3–LB to shut off. When the line relay 3–LB de-energizes, it opens its make contacts 2–3–LB–4 and closes its break contact 2–3–LB–5 and breaks the energizing circuit for the break recognition control relay 2–BRC. Relay 2–BRC interprets this as though it were a line break signal and causes relays 5–BR2 and 5–BR3 to energize upon the closure of its break contact 5–2–BRC–9 in operating circuits previously mentioned for the operation of these relays.

The operation of the select relay 13–SR also completes the operating circuit of the vertical holding magnets 9–HM–XC associated with the circuit line XC over the following path: Ground now closed make contact 9–13–SR–10, now closed break contact 9–12–X–11, now closed normally disabled contact 9-ND-13, the coils of the holding magnets 9–HM–XC to positive potential. The holding magnets 9–HM–XC associated with the line XC are locked to ground over now closed break contact 9–HM–XC and normal-disable break contact 9–ND–XC.

By this time the break generating relay 15–BG has released and opened its make contact 3–15–BG–2 to break the ground circuit to the driver 42 causing the line relay 3–LB in the internal line circuit associated with signal line XC to operate to again close its marking contact 2–3–LB–4 in the signal line circuit XC and thus restore the line circuit XC by terminating line break condition and returning the marking condition. With the circuit being restored and ready to receive transmission from the originating station, an answer-back signal of confirmation, viz. "GA," is transmitted to the originating station over the line circuit XA. The signal "GA" is generated by the answer-back signal generator 40, schematically illustrated in FIG. 8, upon the energization of a No. 1 answer-back trip magnet over a circuit extending from positive potential, the parallel circuit resistor and capacitor network 32, the coils of the No. 1 answer-back trip magnet 9–ABTM, lead 45, the now closed make contact 16–S–8, the now closed make contact 16–12–X–6, the now closed break contact 16–ND–8, the now closed break contact 16–15–BG–5, the now closed make contact 16–13–SR–5 and ground potential.

As soon as the first character "G" of the confirmation signal "GA" is monitored by the sequential selector LS, the sequential selector LS opens a previously closed contact 14–LS–XC due to the breaking of sequence of characters XC and thereby breaks the previously traced operating circuit for the select relay 13–SR. The select relay 13–SR releases inasmuch as its holding path had been previously broken upon the release of the break generating relay 15–BG and the opening of its make contact 13–15–BG–4 in this holding circuit.

With the release of the select relay 13–SR, its break contact 15–13–SR–6 closes and completes an obvious circuit for the break generating relay 15–BG. By this time the character "A" of the confirmation signal "GA" has been transmitted and an auxiliary contact 17–AB–AUX is closed by the rotatable drum (not shown) of the No. 1 answer-back mechanism to complete the energizing circuit for the answer-back control relay 17–ABC through a circuit extending from positive potential, coil of the relay 17–ABC, now closed make contact 17–15–BG–11, now closed auxiliary contact 17–AB–AUX of the answer-back mechanism to ground.

The answer-back control relay 17–ABC closes its make contact 12–17–ABC–1 to operate the line relay 12–X and the line relay 12–X in turn closes its make contact 3–12–X–12 to complete the path over lead 41 from the cross bar switch 25 to the internal outgoing line circuit associated with a signal line circuit XC. The operating path for the line relay 12–X extends from ground through now closed make contact 12–9–HM–XC, through break contact 12–17–ABC–XC, now closed break contact 12–13–SR–8, now closed make contact 12–15–BG–6 and the coil of the X relay to positive potential. The holding circuit for the line relay 12–X extends through the now closed make contact 12–9–HM–XC, through now closed make contact 12–X–2 to the coil of the X relay and to positive potential.

When the line relay 12–X operates, it breaks the operating circuit of the break recognition relay 5–BR1 by opening its break contact 5–12–X–3 and connects the internal outgoing line circuit associated with signal line circuit XC to the cross bar switch 25 by closure of its make contact 3–12–X–12. Now the internal line associated with the XC signal line circuit is connected to the cross bar switch cross point contact 36 to which is connected the signal line circuit XA.

The operator at the outlying station on the line circuit XA having received the confirmatory signal "GA" will now transmit the end-of-address code CR, LF which code upon receipt by the sequential selector LS will cause the opening of the break contact 6–8–LS–CR, LF and thereby the release of the select control relay 6–SC associated with the XA circuit. The de-energization of the select control relay 6–SC permits its break contact 19–6–SC–7 to close and complete an obvious shunt for the select relay 19–S, which then releases. The release of the select relay 19–S will cause the release of the horizontal selector magnet 7–SM associated with the line circuit XA by opening its make contact 7–19–S–4. Also, the release of the select relay 19–S permits its break contact 10–19–S–6 in the sequence circuit to complete a circuit through a chain of similar contacts so that the selector portion of the line switching center is now available for processing further circuit connections to available destinations.

The operator at the outlying station XA will now transmit the message over the line circuit XA which message proceeds through the internal line circuit of the cross bar switching center 10 associated with the line XA, through the cross bar switch's cross-point contact 36 held operated by the holding magnets 9–HM–XC and then proceeds out through the internal outgoing line circuit associated with the signal line circuit XC to the signal line circuit XC upon which is located the receiving station or stations.

After transmission of the message the operator at the calling station on line XA will operate the line break key which generates a line break signal that constitutes an end-of-message code and that is so recognized by the break recognition control relay 2–BRC on the line circuit XA. The line break causes the operating circuit for the break recognition control relay 2–BRC to be broken and therewith the operating circuit for the incoming line relay 2–LA associated with the XA circuit is also broken. The de-energization of the incoming line relay 2–LA on line circuit XA causes its break contact 3–2–LA–4 to open thereby breaking the energizing circuit for the outgoing line control relay 3–LBC associated with the line XA. The de-energization of the outgoing line control relay 3–LBC associated with the line circuit XA opens its make contact 3–LBC–12.

The de-energization of the line relay 2-LA associated with the line circuit XA will affect the release of the holding magnets 9–HM–XC and other relays associated with the outgoing line circuit XC to release this signal line circuit XC as well as the incoming line circuit XA. As the line relay 2–LA on the incoming line circuit XA de-energizes, it closes its break contact 3–2–LA–5 and applies ground potential thereacross and over lead 28 to the cross bar switch cross-point contacts 35 and 36 and over lead 41 to now closed contacts 3–12–X–12 in both the XA and XC internal line circuits, because both sets of holding magnets 9–HM–XA and 9–HM–XC are energized causing each of the cross-point contacts 35 and 36 to be closed to furnish a path through the cross bar switch 25. The application of the ground to the contact 3–LBC–12 in the XA internal line circuit XA is of no consequence since this make contact is now open due to the release of the outgoing line control magnet 3–LBC. However, this identical contact 3–LBC–12 in the XC internal line circuit is still closed and permits ground potential to be placed thereacross and thereby shut off the driver 42 to release the line relay 3–LB in the XC internal line circuit. When the outgoing line relay 3–LB in the XC internal line circuit de-energizes, relay 3–LB opens its make contact 2–3–LB–4 in the signal line circuit XC whereupon the break recognition control relay 2–BRC in the signal line circuit XC de-energizes.

When the break recognition control relay 2–BRC in the signal line circuit XC de-energizes, relay 2–BRC releases the break recognition relay 5–BR3 by opening contact 5–2–BRC–10 in the operating circuit of relay 5–BR3. Aat this time, the line relay 3–LB is de-energized as are the break recognition control relay 2–BRC and break recognition relay 5–BR3 and these relays will remain in this released state until such time as the line break key is released by the operator on the calling line circuit XA which causes the signal line circuit XA to again be completed and to cause the break recognition control relay 2–BRC and line relay 2–LA, both of which are monitoring the signal line circuit XA to again become energized over their previously traced operating paths. The operation of the line relay 2–LA in the XA circuit, of course, affects the outgoing line circuit XC by removing the battery that was applied from the XA internal line circuit through its formerly closed, now open break contact 3–2–LA–5 and through the cross-point contacts 36 to the driver 42 and outgoing line relay 3–LB in the XC internal line circuit.

When the line relay 3–LB operates in the XC internal line circuit upon the removal of the battery potential thereacross, it closes its make contact 2–3–LB–4 in the outgoing signal line circuit XC restoring this circuit to the idle condition. Thus, with the release of the break key, the signal line circuits XA and XC return to their normal idle marking conditions.

With both line relays 3–LA of the signal line circuits XA and XC energized both of the break recognition control relays 2–BRC become energized and open their respective normally closed contacts 5–2–BRC–9 in their respective holding circuits for the line holding magnets 9–HM–XA and 9–HM–XC, which circuits have previously been traced. Also, it should be pointed out that the parallel holding circuits for the holding magnets 9–HM–XA and 9–HM–XC are broken because of the previous opening of the contact 5–BR3–2. With the dropping of the vertical holding magnets 9–HM–XA and 9–HM–XC the cross point contacts 35 and 36 operated thereby, respectively, open and thereby disconnect the signal line circuits XA and XC. When the holding magnets 9–HM–XA and 9–HM–XC de-energize, they also open their respective make contacts 12–9–HM–XA and 12–9–HM–XC to break their respective operating circuits for their respective line relays 12–X.

Of course, with the release of the relays 12–X, the lines XA and XC now appear to be idle to the rest of the circuits and available for futher connections. Also, the line relays 12–X close their respective break contact 5–12–X–3 in the energizing circuits for their respective break recognition relays 5–BR1, which operate again and join with their respective break recognition control relays 2–BRC to await the next line break signal.

*A station calls another station on a line circuit that is busy*

In the foregoing interconnection between the calling line circuit XA and the called line circuit XC, it was assumed that line circuit XC was idle. However, if the line circuit XC had not been idle but had been busy, then a different sequence of operations would have transpired to cause a No. 2 answer-back trip magnet 9 ABTM #2 to release a No. 2 answer-back mechanism to transmit to the calling station the signals "LTRS, B. Z" and thereafter to automatically disconnect the line circuit XA from the line switching center 10 so that the line switching center 10 will be available for switching.

It is now assumed that the operator at an outlying station on the signal line circuit XA has been connected to the line switching center 10 in the manner set forth previously and has received a confirmatory signal "GA" signifying that the line switching center 10 is ready for the call directing code of the desired line circuit. The transmission of the call directing code XC by the sending station AA is monitored by the sequential selector LS and upon analysis thereof, the contacts 14–LS–XC are closed to complete an energizing circuit for the select relay 13–SR over a circuit extending from ground (FIG. 14), now closed universal contact 14–LS–U, now closed make contact 14–LS–XC, lead 48, the pin XC on the LSP terminal board, the connector 3 on SRP terminal board, and over lead 44 to the coil of the select relay 13–SR to positive potential. Operation of the select relay 13–SR opens its break contact 15–13–SR–6 in the obvious operating circuit for the break generating relay 15–BG, which relay then releases.

Since the line relay 12–X associated with the line circuit XC is already energized and signifying that the line XC is busy, its make contact 16–12–X–6 will be closed to complete an energizing circuit for the answer-back trip magnet 9–ABTM#2 associated with the No. 2 answer-back mechanism rather than the No 1 answer-back mechanism. The No. 2 answer-back mechanism furnishes the busy signal "LTRS, B, Z" to the contacts of the signal generator 50 show in FIG. 8 which transmits its sequential signals over a path previously described for the signal generator 40 to the line relay 3–LB for the line XA. The circuit for magnet 9–ABTM#2 extends from ground, now closed make contact 16–13–SR–5, now closed break contact 16–15–BG–5, now closed break contact 16–ND–8, now closed make contact 16–12–X–6, now closed break contact 16–19–S–9, the coil of the No. 2 answer-back trip magnet 9–ABTM#2 and parallel resistor and capacitor 32 to positive potential. As the busy code "LTRS, B, Z" is being transmitted out over line circuit XA, the sequential selector unit LS at the line switching center 10 also is monitoring the code and in response to the sequence of "B" and "Z" the sequential selector LS closes a make contact 8–LS–BZ to complete an operating circuit for a busy relay 8–BZ from ground potential, now closed make contact 8–LS–BZ, now closed break contact 8–7–BZ BG–8, the coil of the busy relay 8–BZ to a source of positive potential. The busy relay 8–BZ is locked to ground through now closed make contact 8–BZ–2 and now closed make contact 8–18–BZG1–8.

Operation of the busy relay 8–BZ opens its break contact 18–8–BZ–6 in the operating circuit of slow release relay 18–BZBG1 which does not release so quickly as to destroy the holding circuit for the busy relay 8–BZ through its make contact 8–18–BZBG1–8 until after a time interval determined by the release time of the relay 18–BZBG1.

The function of the busy relay 8–BZ is to generate a "line break" signal so that the line circuit XA will be disconected from the line switching center 10. Operation of the busy relay 8–BZ completes a circuit to apply ground to the driver 42 and the line relay 3–LB to turn off the driver 42 and thereby de-energize line relay 3–LB and open the signal line circuit XA. Ground potential is to driver 42 as follows: From ground through now closed make contact 8–BZ–4, now closed break contact 8–7–BZBG2–5, leads 30 and 29, now closed make contact 4–7–SM–XA, lead 28, lead 47, the now closed make contact 3–LBC–12 to driver 42. When the outgoing line relay 3–LB de-energizes and opens make contact 2–3–LB–4 in the line circuit XA, the energizing paths for the break recognition control relay 2–BRC and incoming line relay 2–LA are broken and they recognize this interruption as a "line break" signal. Opening of the previously closed break contact 5–2–BRC–9 in the holding circuit for the vertical holding magnets 9–HM–XA causes these holding magnets 9–HM–XA to release and, in turn, open contact 12–9–HM–XA to break the operating and holding circuits for the line relay 12–X associated with the line circuit XA.

Ground potential also was applied to shut off the driver 31 to de-energize the sequence selector magnet 8–LS and thereby disconnect the sequential selector LS from monitor. The sequential selector LS upon shut down opens its previously closed make contact 8–LS–BZ to break the operating path for the busy relay 8–BZ and after sufficient time has elapsed for the slow release relay 8–BZBG1 to release, the holding circuit for the busy relay 8–BZ is broken by the opening of make contact 8–18–BZBG1–8. With the release of the busy relay 8–BZ, make contact 8–BZ–4 opens and removes ground potential being applied to the drivers 31 and 42. Upon removal of this ground potential the energizing circuit for the line relay 3–LB is completed as is the energizing circuit for the line selector magnet 8–LS.

Operation of the outgoing line relay 3–LB associated with the line circuit XA results in the operation of the break recognition control relay 2–BRC and in the operation of the incoming line relay 2–LA in the signal line circuit XA.

The release of the line relay 12–X closes contact 5–12–X–3 to complete the operating circuit for the break recognition relay 5–BR1. Upon operation of the break recognition relay 5–BR1, it opens its break contact 6–5–BR1–9 to release the select control relay 6–SC. Release of the select control relay 6–SC closes break contact 19–6–SC–7 to shunt down select relay 19–6.

Release of the select relay 19–S opens its make contact 7–19–S–4 to break an obvious circuit for the selector magnet 7–SM–XA thereby releasing the selector portion of the line switching center 10 from connection to the XA internal line circuit and closes break contact 10–19–S–6 to complete the sequence circuit. Hence, line switching center 10 is rendered idle and capable of switching for future requests.

From the forgoing it should be apparent that the present line switching center 10 is capable of connecting any two signal line circuits together automatically without the attendance of an operator at the line switching center 10 and is also capable of rendering a signal line circuit unavailable to the other signal line circuits when a station on one signal line is calling a station on the same signal line. Furthermore, it should be apparent in the foregoing description that each signal line circuit XA–XJ has an associated internal line circuit for connection to any other internal line circuit through a cross-point contact of the cross bar switch and has a make contact 3–LBC–12 in its internal circuit to prevent its outgoing line relay from receiving the incoming signals being conveyed through the cross bar switch to an internal line circuit associated with another signal line circuit. In this manner the transmitting station's signals are prevented from being reflected back through the cross bar switch into the sending station's signal line circuit.

The selector portion of the line switching center 10 has an answer-back mechanism for transmitting a busy signal to a calling station when the desired signal line circuit is busy and has circuitry for automatically disconnecting the calling station from the line switching center 10 when the called signal line circuit is busy. Therefore, the line switching center 10 is quickly released and made available for other switching business in the event the called station is busy.

Although only one embodiment of the invention is shown in the drawings and described in the foregoing specification, it will be understood that invention is not limited to the specific embodiment described but is capable of modification and rearrangement and substitution of parts and elements without departing from the spirit of the invention.

What is claimed is:

1. In a telegraph switching system having multi-station lines and a cross bar switching means at a switching center for interconnecting one of said multi-station lines with another of said multi-station lines and wherein a station on one of the multi-station lines can transmit to another station on the same multi-station line, the improvement comprising:

(a) means at the switching center for preventing the signals transmitted from one station to another station on the same line from being reflected through the cross bar switching means and returned into the transmitting multi-station line, and (b) means at the switching center for signifying that the multi-station line is busy when one station on that line is transmitting to another station on the same line and for preventing the interconnection of another multi-station line to the multi-station line on which said one station is transmitting to another station.

2. In a telegraph switching system, (a) a switching center, (b) a plurality of remote telegraph stations capable of transmitting and receiving signals, (c) a plurality of lines connecting said stations to said switching center, predetermined ones of said lines having a plurality of stations thereon thereby constituting a multi-station line, (d) means at said switching center for connecting any line to another line, (e) means at the switching center for preventing said signals from a transmitting station from being reflected through the switching center back to the transmitting station over the transmitting station's line.

3. The telegraph system of claim 2 wherein is provided means at said switching center indicating a busy condition to a station requesting a line when at least two stations on the requested line are interconnected and indicating a busy condition when a station on the requested line is connected to a station on another line.

4. In a switching system having an unattended automatic, line switching center, (a) a plurality of circuit lines with at least one station thereon, (b) a plurality of internal circuits each connected to an associated one of said circuit lines at the switching center, (c) cross bar switching means at the switching center for connecting any one of the internal circuits to any other of said internal circuits, and (d) means in each of said internal circuits for preventing signals originating on its associated circuit line from being returned from said cross bar switching means and transmitted over its associated circuit line.

5. The switching system of claim 4 wherein there are provided disconnecting and busy indicating means at said line switching center for automatically indicating to a calling circuit line that the called circuit line is busy and for disconnecting said calling circuit line from said line switching center.

6. In a switching system having an unattended, automatic line switching center, (a) a plurality of multi-station lines connected to said line switching center for interconnection with one another, (b) a plurality of signal line circuits at said line switching center, each of said signal line circuits connected with one of said multi-station lines and having an incoming line relay responsive to incoming line signals, (c) a plurality of internal line circuits, each of said internal line circuits having switch means therein operated in response to said line signals by said incoming line relay of an associated signal line circuit, (d) a cross bar switch, (e) means for connecting any one of said internal line circuits through said cross bar switch to any other of said internal line circuits, (f) an outgoing line relay in each of said internal line circuits operated and released in response to line signals, each outgoing line relay having switching means in the signal line circuit associated with its internal line circuit for generating line signals in that signal line circuit, (g) a control relay in each of said internal line circuits and operated by said switching means of said incoming line relay, and (h) control switch means operated by said control relay for holding the outgoing line relay of an internal line circuit in one position while the incoming line relay of said associated signal line circuit and the control relay of the same internal line circuit are changing positions in response to an incoming line signal.

7. In a switching system having unattended, automatic line switching center, (a) a plurality of multi-station lines connected to said line switching center for interconnection with one another, (b) a plurality of signal line circuits at said line switching center, each of said signal line circuits connected to one of said multi-station lines and having an incoming line relay responsive to incoming line signals, (c) a plurality of internal line circuits, each of said internal line circuits having switch means therein operated in response to said line signals by said incoming line relay of an associated signal line circuit, (d) a cross bar switch, (e) means for connecting any one of said internal line circuits through said cross bar switch to any other of said internal line circuits, (f) an outgoing line relay in each of said internal line circuits operated and released in response to the line signals, each outgoing line relay having switching means in the signal line circuit associated with its internal line circuit for generating line signals in that signal line circuit, (g) a control relay in each of said internal line circuits and operated by said switching means of said incoming line relay of said associated signal line circuit, (h) control switch means operated by said control relay for holding the outgoing line relay of an internal line circuit in one position while the incoming line relay of said associated signal line circuit and the control relay of the same internal line circuit are changing positions in response to an incoming line signal, and (i) a line connect relay for each of said internal line circuits and operated while its internal line circuit is connected to said cross bar switching means to complete a path from said cross bar switching means to its internal line circuit.

8. In a switching system having unattended, automatic line switching center, (a) a plurality of multi-station lines connected to said line switching center for interconnection with one another, (b) a plurality of signal line circuits at said line switching center, each of said signal line circuits connected to one of said multi-station lines and having an incoming line relay responsive to incoming line signals, (c) a plurality of internal line circuits, each of said internal line circuits having switch means therein operated in response to said line signals by said incoming line relay of an associated signal line circuit, (d) a cross bar switch, (e) means for connecting any one of said internal line circuits through said cross bar switch to any other of said internal line circuits, (f) an outgoing relay in each of said internal line circuits operated and released in response to the line signals, each outgoing line relay having switching means in the signal line associated with its internal line circuit for generating line signals in that signal line circuit, (g) a control relay in each of said internal line circuits and operated by said switching means of said incoming line relay of said associated signal line circuit, (h) control switch means operated by said control relay for holding the outgoing line relay of an internal line circuit in one position while the incoming line relay of said associated signal line circuit and the control relay of the same internal line circuit are changing position in response to an incoming line signal, (i) a line connect relay for each of said internal line circuits and operated while its line circuit is connected to said cross bar switching means, and (j) busy signal generating means individually controlled by each of said line connect relays and operated in response to an attempt to interconnect to an internal line circuit already connected with said cross bar switching means for generating busy signals indicative of the previous connection of the called lines being already connected.

9. In a switching system having an unattended, automatic line switching center, (a) a plurality of multi-station lines connected to said line switching center for interconnection with one another, (b) a plurality of signal line circuits at said line switching center, each of said signal line circuits connected to one of said multi-station lines and having an incoming line relay responsive to incoming line signals, (c) a plurality of internal line circuits, each of said internal line circuits having switch means therein operated in response to said line signals by said incoming line relay of an associated signal line circuit, (d) a cross bar switch, (e) means for connecting any one of said internal line circuits through said cross bar switch to any other of said internal line circuits, (f) an outgoing line relay in each of said internal line circuits operated and released in response to the line signals, (g) switching means in said associated signal line circuit operated by said associated outgoing line relay to generate line signals in that signal line circuit, (h) a control relay in each of said internal line circuits and operated by said switch means of said incoming line relay in said associated signal line circuit, (i) control switch means operated by said control relay for holding the outgoing line relay of an internal line circuit in one position while the incoming line relay of said associated signal line circuit and the control relay of the same internal line circuit are changing position in response to an incoming line signal, (j) a line connect relay for each of said internal line circuits, each line connect relay being operated while its internal line circuit is connected to said cross bar switching means, (k) a busy signal generating means, said busy signal generating means individually controlled by each of said line connect relays and operated in response to an attempt to interconnect to an internal line circuit already connected with said cross bar switching means for generating busy signals indicative of the previous connection of the called internal line circuit to said cross bar switching means, and (l) disconnecting means operated in response to operation of said busy signal generating means for disconnecting said calling signal line circuit from said line switching center.

10. In a switching system having an unattended, automatic line switching center with a plurality of multi-station lines connected to said line switching center for interconnection with one another, stations on each line capable of transmitting line signals to and/or receiving line signals from stations on the same or a different multi-station line, (a) a plurality of signal line circuits at said line switching center, each of said signal line circuits connected to one of said multi-station lines and having an incoming line relay responsive to incoming line signals, (b) a break recognition means in each of said signal line circuits for recognizing a "line break" signal, (c) a plurality of internal line circuits, each of said internal line circuits having switch means therein operated in response to said line signals by said incoming line relay of an associated signal line circuit, (d) a cross bar switch having cross point contacts horizontally and vertically connected to each of said internal line circuits, (e) selector means including horizontal selector magnets and vertical holding magnets for closing selected cross point contacts of said cross bar switching means, (f) break recognition control circuit means operated by said break recognition means in response to a first "line break" signal for enabling said selector means to connect said calling station's internal line circuit to said cross bar switching means and in response to a succeeding "line break" signal for disconnecting said calling and called internal line circuits from said cross bar switching means, (g) an outgoing line relay in each of said internal line circuits operated and released in response to line signals, each outgoing line relay having switching means in the signal line circuit associated with its internal line circuit for generating line signals therein, (h) a control relay means in each of said internal line circuits and operated by said switching means of said incoming line relay of said associated signal line circuit, and (i) control switching means in each of said internal line circuits and operated by said control relay for holding said outgoing line relay in one condition while the incoming line relay of its associated signal line circuit and the control relay in its internal line circuit are changing conditions in response to incoming line signals.

11. In a switching system having an unattended, automatic line switching center with a plurality of multi-station lines connected to said line switching center for interconnection with one another, stations on each line capable of transmitting line signals to and/or receiving line signals from stations on the same or a different multi-station line, (a) a plurality of signal line circuits at said line switching center, each of said signal line circuits connected to one of said multi-station lines and having an incoming line relay responsive to incoming line signals, (b) a break recognition means in each of said signal line circuits for recognizing a line break signal, (c) a plurality of internal line circuits, each of said internal line circuits having switch means therein operated in response to said line signals by said incoming line relay of an associated signal line circuit, (d) a cross bar switch having cross point contacts horizontally and vertically connected to each of said internal line circuits, (e) selector means including horizontal selector magnets and vertical holding magnets for closing selected cross point contacts of said cross bar switching means, (f) break recognition control circuit means operated by said break recognition means in response to a first "line break" signal for enabling said selector means to connect said calling station's internal line circuit to said cross bar switching means and operated in response for a succeeding "line break" signal to disconnecting said calling and called internal line circuits from said cross bar switching means, (g) an outgoing line relay in each of said internal line circuits operated and released in response to line signals, each outgoing line relay having switching means in to signal line circuit associated with its internal line circuit for generating line signals therein, (h) a control relay means in each of said internal line circuits and operated by said switching means of said incoming line relay of said associated signal line circuit, (i) control switching means in each of said internal line circuits and operated by said control relay for holding the outgoing line relay in one condition while the incoming line relay of its associated signal line circuit and the control relay in its internal line circuit are changing conditions in response to incoming line signals, and (j) a line connect relay for each of said internal line circuits, each line connect relay being operated while its internal line circuit is connected to said cross bar switching means for completing this connection from said cross bar switching means to its internal line circuit.

12. In a telegraph switching system having an unattended, automatic line switching center with a plurality of multi-station lines connected to said line switching center for interconnection with one another, stations on each line capable of transmitting line signals to and/or receiving line signals from stations on the same or a different multi-station line, (a) a plurality of signal line circuits at said line switching center, each of said signal line circuits connected to one of said multi-station lines and having an incoming line relay responsive to incoming line signals, (b) a break recognition means in each of said signal line circuits for recognizing a line break signal, (c) a plurality of internal line circuits, each of said internal line circuits having switch means therein operated in response to said line signals by said incoming line relay of an associated signal line circuit, (d) a cross bar switch having cross point contacts horizontally and vertically connected to each of said internal line circuits, (e) selector means including horizontal selector magnets and vertical holding magnets for closing selected cross point contacts of said cross bar switching means, (f) break recognition control circuit means operated by said break recognition means in response to a first "line break" signal for enabling said selector means to connect said calling station's internal line circuit to said cross bar switching means and operated in response to a succeeding "line break" signal for disconnecting said calling and called internal line circuits from said cross bar switching means, (g) an outgoing line relay in each of said internal line circuits operated and released in response to line signals, each outgoing line relay having switching means in the signal line circuit associated with its internal line circuit for generating line signals therein, (h) a control relay means in each of said internal line circuits and operated by said switching means of said incoming line relay of said associated signal line circuit, (i) control switching means in each of said internal line circuits and operated by said control relay for holding the outgoing line relay in one condition while the incoming line of its associated signal line circuit and the control relay in its internal line circuit are changing conditions in response to incoming line signals, (j) a line connect relay for each of said internal line circuits, each line connect relay being operated while its internal line circuit is connected to said cross bar switching means for completing this connection from said cross bar switching means to its internal line circuit, and (k) busy signal generating means individually controlled by each of said line connect relays and operated in response to an attempt to interconnect to an internal line circuit already connected with said cross bar switching means for generating busy signals indicative thereof.

13. In a telegraph switching system having an unattended, automatic line switching center with a plurality of multi-station lines connected to said line switching center for interconnection with one another, stations on each line capable of transmitting line signals to and/or receiving line signals from stations on the same or a different multi-station line, (a) a plurality of signal line circuits at said line switching center, each of said signal line circuits connected to one of said multi-station lines and having an incoming line relay responsive to incoming line signals, (b) break recognition means in each of said signal line circuits for recognizing a line break signal, (c) a plurality of internal line circuits, each of said internal line circuits having switch means therein operated in response to said lines signals by said incoming line relay of an associated signal line circuit, (d) a cross bar switching means having cross point contacts horizontally and vertically connected to each of said internal line circuits, (e) selector means including horizontal selector magnets and vertical holding magnets for closing selected cross point contacts of said cross bar switching means, (f) break recognition control circuit means operated by said break recognition means in response to a first "line break" signal for enabling said selector means to connect said calling station's internal line circuit to said cross bar switching means and operated in response to a succeeding "line break" signal for disconnecting said calling and called internal line circuits from said cross bar switching means, (g) an outgoing line relay in each of said internal line circuits operated and released in response to line signals, each outgoing line relay having switching means in the signal line circuit associated with its internal line circuit for generating line signals therein, (h) a control relay means in each of said internal line circuits and operated by said switching means of said incoming line relay of said associated signal line circuit, (i) control switching means in each of said internal line circuits and operated by said control relay for holding said outgoing line relay in one condition while the incoming line relay of its associated signal line circuit and the control relay in its internal line circuit are changing conditions in response to incoming line signals, (j) a line connect relay for each of said internal line circuits, each line connect relay being operated while its internal line circuit is connected to said cross bar switching means for completing this connection from said cross bar switching means to its internal line circuits, (k) busy signal generating means, individually controlled by each of said line connect relays and operated in response to an attempt to interconnect to an internal line circuit already connected with said cross bar switching means for generating busy signals indicative thereof, and (l) disconnect signal generating means operated in response to operation of said busy signal generating means to generate a succeeding "line break" signal for causing said break recognition control circuit means to disconnect said calling signal line circuit from said line switching center.

References Cited by the Examiner

UNITED STATES PATENTS

| | | | |
|---|---|---|---|
| 2,164,731 | 7/1939 | Bascom | 179—17 |
| 2,298,204 | 10/1942 | Erwin | 179—17 |
| 2,595,944 | 5/1952 | Hersey | 179—17 |

ROBERT H. ROSE, *Primary Exemainer.*

H. ZELLER, *Assistant Examiner.*